April 5, 1938. E. P. HALLIBURTON Re. 20,688

APPARATUS FOR TESTING OIL WELLS

Original Filed Aug. 28, 1934

INVENTOR.
Erle P. Halliburton.
BY Earl Babcock
ATTORNEY

Reissued Apr. 5, 1938

Re. 20,688

UNITED STATES PATENT OFFICE 20,688

APPARATUS FOR TESTING OIL WELLS

Erle P. Halliburton, Los Angeles, Calif., assignor to Halliburton Oil Well Cementing Co., Duncan, Okla., a corporation of Delaware Original No. 2,092,062, dated September 7, 1937, Serial No. 741,780, August 28, 1934. Application for reissue November 26, 1937, Serial No. 176,721

9 Claims. (Cl. 166—1)

This invention relates to an apparatus for testing wells, such as oil wells, and refers particularly to the type of apparatus for testing wells, in which a single string of pipe is lowered into the oil well carrying a packer which may be set in the bottom of the well, and carrying also a valve which may be opened and closed by manipulation of the pipe from the top of the well.

It is the general object of the present invention to provide an apparatus of the type mentioned, so constructed that the valve or valves controlled in communication with the string of pipe may be operated by vertical motion of the string of pipe and at the same time so construct the apparatus that the weight of the pipe may be used for setting the packer firmly in position without the valves being opened, except when desired.

Another object of the present invention is to provide an apparatus for testing oil wells, which is provided with valves controlled by a vertical motion of the pipe and yet may be locked by motion of the pipe in an open position and removed from the well hole.

A further object of the present invention is to provide an apparatus for testing oil wells in which the operation of the valves is controlled by a vertical motion of the pipe and in which the construction of the apparatus provides a strong flush shoulder seat of non-yielding character for receiving the weight of the apparatus and force necessary to remove the same from the well hole.

A further object of the present invention is to provide a well tester with a valve arrangement which will permit a very accurate control over the opening of the valves so as to avoid any sudden release of pressure on the formation to be tested, and further to provide an arrangement of valves which will not be cut in testing wells as in the case of other testers now in use, which frequently cut out the valves in operation due to the sudden release of pressure and the rapid passage of fluid by the valve.

It is a further object of the present invention to provide a well tester in which the valves are controlled by vertical motion of the pipe with a pressure chamber, so that the hydrostatic head of liquid in the well may be used for assisting the operation of closing the valve when it is desired to close the apparatus and withdraw the same from the well hole.

Various further objects and advantages of the apparatus for testing wells constituting the present invention will be apparent from a description of a preferred form or example of such apparatus, as illustrated in the accompanying drawing.

Figures 1, 2, 3, 4, 5:
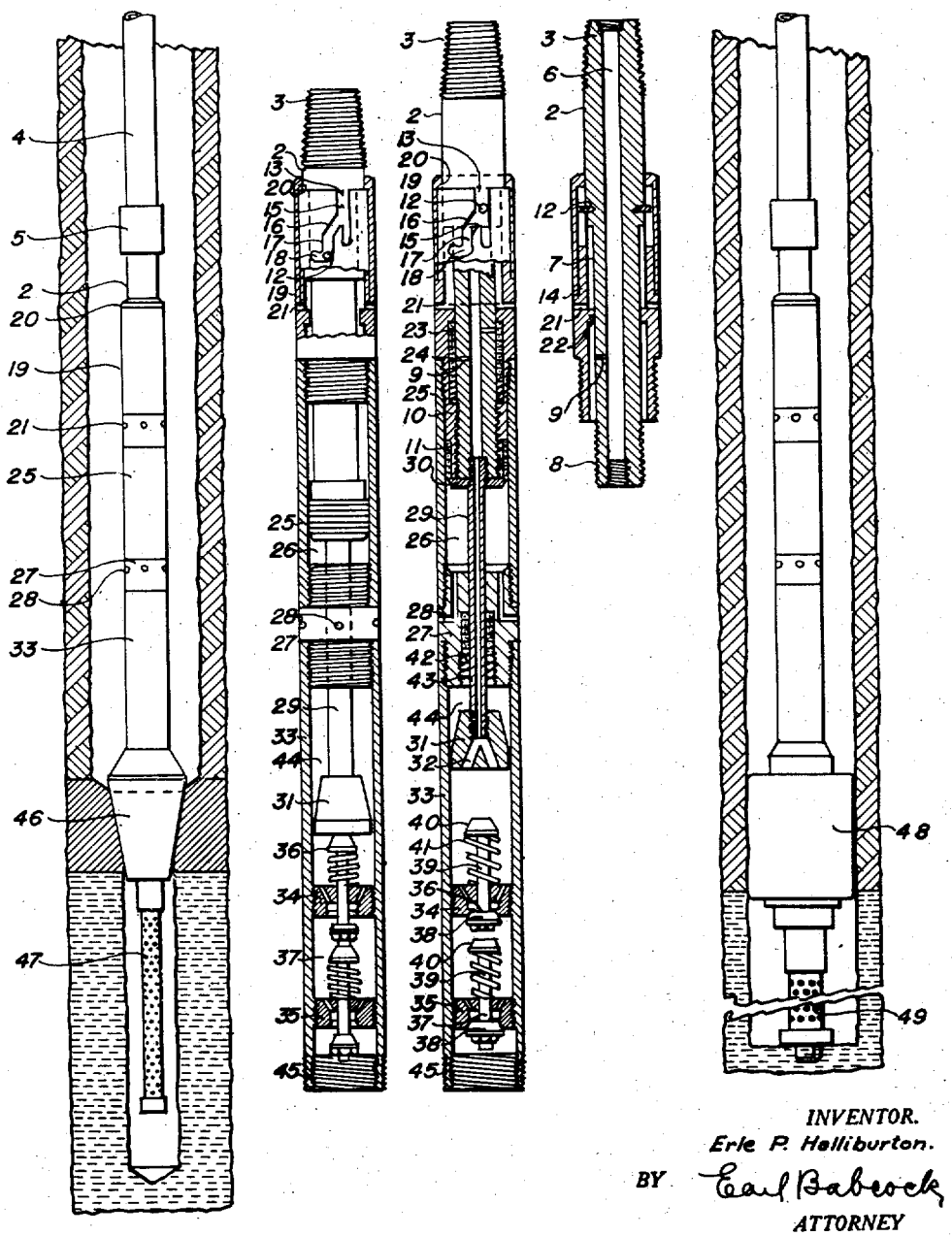
Figure 1 is a vertical elevation showing the apparatus in position in a well hole and equipped with the rat hole type of packer.
Figure 2 is an enlarged view, partially in vertical section, of the apparatus with the packer removed and the valve shown in the open position.
Figure 3 is a similar view illustrating the valve in a closed position.
Figure 4 is an elevation at right angles to Figure 3 of the upper portion of the apparatus.
Figure 5 is an elevation similar to Figure 1, showing the apparatus equipped with the side wall type of packer in place of the rat hole type of packer.

Referring to the drawing, the apparatus is illustrated as comprising a mandrel 2, having a threaded stem 3 at its upper end for attachment to a string of pipe 4, as by a collar 5. In practice, the string of pipe 4 extends to the surface of the well being tested and may be made up of any number of joints of pipe.

The mandrel 2 is provided with a bore 6 for the passage of fluid therethrough in testing operations and is reduced in diameter, as indicated at 7, to receive packing, and at its lower end is further reduced and threaded, as indicated at 8. It is also provided with a port 9 for discharge of any fluid which may have leaked by the packing of the tool. To the threaded lower end 8 of the mandrel is threaded a piston 10 which has a reduced portion to receive packing rings 11.

The mandrel 2 is provided with one or more pins 12, which operate in J-slots 13 cut in a sleeve 14. The sleeve 14 is a portion of the main body of the apparatus. The J-slot 13 is provided with one vertical portion 15, in which the pins 12 may move which limit the motion of the mandrel 2 relative to the body so as to prevent the mandrel while in this portion of the slot opening the valves. The slot has a further diagonally slanting portion 16 leading to a vertical section 17, which extends a sufficient depth so that the mandrel, when the pins are lowered into this portion of the slot, may operate the valves. The J-slot has a further portion 18 in which the pins 12 may be set for locking the apparatus in the open position.

The sleeve 14 is reduced at its upper end to receive a small sleeve 19 to encase the J-slot 15, and the sleeve 19 in turn is provided at its upper end with a ring or bead 20 covering the upper end of the sleeve 14. The sleeve 14 is also provided with pressure releasing ports 21 for releasing fluid under the shoulder 7 of the mandrel. The sleeve 14 is also provided with an internal flange 22 for holding rings 23 of a packing against the mandrel 2 and with a packing follower internally threaded to the lower end of said sleeve.

In practice, the follower 24 is set flush with the lower end of the sleeve 14, and it is the lower end of the sleeve 14 and the follower 24 which provide a square seat for receiving the lifting strain from the plunger 10 attached to the mandrel 2. By this construction the apparatus is provided with a firm strong non-yielding seat for application of the lifting strain to the body of the tool when it is desired to withdraw the apparatus from the well-hole. This construction is found to obviate the difficulties frequently experienced with other types of tools where the lifting strain has been imposed upon a yielding or resilient seat, which frequently has resulted in the tool parting.

Below the sleeve 14 the body is composed of a further sleeve 25 threaded onto the sleeve 14, which sleeve 25 forms below the mandrel 2 a pressure chamber, into which fluid from the well may enter so as to apply the hydrostatic head of such fluid under the plunger 10 and facilitate lifting such plunger upwardly when it is desired to close the valves. Said pressure chamber, which is indicated at 26, is closed at its lower end by a nipple 27 which is a portion of the body of the tool and which is provided with the ports 28 for flow of fluid to and from the pressure chamber 26. The mandrel 2 is threaded at its lower end to a tube 29 to which is threaded a nut 30. The tube 29 extends through the pressure chamber 26 and nipple 27 to provide a passage for fluid being tested. Below the nipple 27 the tube 29 is provided with a head 31 having fluid passages 32.

The body of the tester includes a further sleeve portion 32 threaded to the lower end of the nipple 27 and internally threaded to seats 34 and 35, respectively, of valves 36 and 37, respectively.

The valves 36 and 37 each includes a valve head 38 engaging a tapered shoulder on the seats 34 and 35, respectively, which valve head is mounted upon rod 39 having contact head 40 at its upper end. Spring 41 yieldingly urges the valve to the closed position.

Within the nipple 27 there is provided packing 42, held in position by follower 43 to prevent leakage of fluid from the chamber 44 into the pressure chamber 26. The lower sleeve 33 of the body is threaded at its lower end, as indicated at 45, for attachment to a packer and perforated inlet tube. In some cases the rat hole type of packer 46 as indicated in Figure 1, having the perforated tube 47 is employed, and in other cases a wall packer 48 having a perforated tube, such as 49 may be used.

In operation of the apparatus thus described, there is attached to a string of drill pipe 4 either the packer 46 or 48, with an inlet tube attached to its lower end. The mandrel 2 is set in a position where its pins 12 are in the vertical portion 15 of the J-slot in the body. In this position, the end of the slot prohibits the head 31 being lowered a sufficient distance to strike the head 40 of the valve 36. Both valves 36 and 37 are hence in the closed position, and the drill pipe 4 and its communicating ports above the valves 37 and 36 are hence empty of fluid. The apparatus is lowered into the bottom of the well hole, where, in case the side wall packer 48 is used, this packer is set into sealing engagement with the sides of the well hole in any usual or preferred manner, or where the rat hole packer 46 is employed this packer is forced into the top of the rat hole, as indicated in Figure 1. Any desired amount of pressure from the pipe 4 may be employed in so operating the valves to secure a firm seal without the valves 36 or 37 being opened and without permitting any fluid to enter the drill pipe 4. The operation of seating the packer prevents the fluid mud which fills the well around the outside of the apparatus from entering the apparatus when the valves 36 and 37 are opened, and at the same time cuts the hydrostatic pressure of this fluid mud from the formation so that the fluids in the formation may enter the inlet pipes and into the apparatus and to the drill pipe 4 whenever the valves are open.

After the packer has been set, the pipe 4 and mandrel 2 are raised slightly and turned to cause the pins 12 on mandrel 2 to pass through the diagonal slot 16 into the second vertical portion. The pipe 4 and mandrel 2 are then lowered to lower mandrel 2 while pins 12 pass down the vertical portion 17 of the J-slot until the head 31, mounted on the tube 29, which is connected with the mandrel tube and, therefore, may be considered a part thereof, strikes the head 40 on the valve 36. Further lowering of the pipe causes this valve to open, which in turn strikes the head on the lower valve and causes the lower valve to open.

It will be noted that the lower valve opens slightly after the upper valve has opened. This, it has been discovered, is important in securing a gradual opening of the apparatus and preventing any sudden release of pressure on the oil formation. If the fluids in the formation to be tested, whether water, oil, or gas, are under a very high pressure, and if this pressure is suddenly released by a sudden opening of the valves into an empty chamber, both the valves may be in part cut out and the formation may be caused to collapse.

The apparatus is left in the open position for a sufficient period of time to make a test, which in case of fluids such as oil or gas will cause the oil or gas to rise in the apparatus and up into the pipe 4 to a height depending upon the pressure behind said fluids in the formation. At the end of this period the pipe is raised to remove the contact between the head 31 of the mandrel and the head 40 of the valve 36, and the valves thereby are returned to the closed position. The operation of elevating pipe 4 and mandrel 2, while leaving the body of the apparatus in a stationary position, is facilitated by the pressure chamber 26. Fluid in the well enters the ports 28 into this pressure chamber 26 and provides a pressure tending to close the apparatus. This is of value where the apparatus is used in testing loose formations which will not grip solidly the packer.

In such cases, were it not for the use of the pressure chamber 26, the packer might be pulled away from its seat without the valves 36 or 37 being closed.

In certain cases, it may happen that the packer either slips upon its seat or fails to hold, in which case the mud fluid in the well will succeed in entering the apparatus. This is almost always observable to the operator at the top of the well and it is then his desire to withdraw the apparatus empty. For this purpose, the apparatus may be locked in the open position by turning the apparatus so as to position the pins 12 of the mandrel in the notch 18 of the slots, whereupon the entire apparatus may be elevated to the top of the well and the valves 36 and 37 will be held in the open position.

While the particular form of the apparatus herein described is well adapted to carry out the objects of the invention, it is to be understood that various modifications and changes may be made without departing from the scope of the invention as set forth in the appended claims.

I claim:

1. An apparatus for testing a well hole, when attached to a string of pipe, including a body having means at its lower end for attachment with a packer, a mandrel reciprocally mounted within the body and having means at its upper end for attachment to the string of pipe, a normally closed valve within said body adapted to contact the said mandrel and be actuated thereby to the open position, and a pin and slot connection between said mandrel and body operative, in one position of the mandrel relative to the body, to limit the reciprocating motion of the mandrel to prevent its opening the valve, and in another position to permit the mandrel to be lowered sufficiently to open the valve.

2. An apparatus to be used in testing wells connected to a packer and a string of pipe, said apparatus comprising a body carrying a plurality of vertically spaced apart valves, one adapted to be opened by engagement with the other, a mandrel adapted to reciprocate within said body and in a lower position engage the upper valve to open the same, and a pin and slot connection between the mandrel and body operative in one position to prevent the lowering of the mandrel relative to the body sufficiently to open the valves and in another position to permit the mandrel to be lowered sufficiently to engage said valves.

3. An apparatus to be used in testing wells connected to a packer and a string of pipe, said apparatus comprising a body carrying a plurality of vertically spaced apart valves, one adapted to be opened by engagement with the other, a mandrel adapted to reciprocate within said body and in a lower position engage the upper valve to open the same, and a pin and slot connection between the mandrel and body operative in one position to prevent the lowering of the mandrel relative to the body sufficiently to open the valves and in another position to permit the mandrel to be lowered sufficiently to engage said valves, said pin and slot connection including a portion for locking the mandrel and body in position for maintaining the valves open.

4. An apparatus to be attached to a packer and string of pipe for testing a well, said apparatus including a body for carrying valves, valves carried by said body, a mandrel reciprocally mounted within said body and adapted to engage said valves for opening the same, and means forming with said body and mandrel a pressure chamber for permitting the hydrostatic head of fluid within the well to assist in elevating the mandrel with respect to the body.

5. An apparatus for testing oil wells when connected with a packer and string of pipe, said apparatus comprising a body including an upper sleeve, a lower sleeve and a nipple interconnecting said sleeves, a valve carried by said lower sleeve of said body, a mandrel positioned to reciprocate within said body and extending through said nipple so as to be in position for contacting and operating said valve, ports connecting the upper sleeve of said body with the exterior whereby said upper sleeve may operate as a pressure chamber for vertically moving said mandrel.

6. An apparatus for testing oil wells when connected with a packer and string of pipe, said apparatus comprising a body including an upper sleeve, a lower sleeve and a nipple interconnecting said sleeves, a valve carried by said lower sleeve of said body, a mandrel positioned to reciprocate within said body and extending through said nipple so as to be in position for contacting and operating said valve, ports connecting the upper sleeve of said body with the exterior whereby said upper sleeve may operate as a pressure chamber for vertically moving said mandrel, and a pin and slot connecting means between said body and mandrel having a portion adapted on one relative position of the mandrel and body to prohibit the mandrel being lowered sufficiently to open said valves, and having a further portion adapted to permit the mandrel to be lowered relative to the body sufficient to open the valves.

7. An apparatus for testing oil wells when connected with a packer and string of pipe, said apparatus comprising a body including an upper sleeve, a lower sleeve and a nipple interconnecting said sleeves, a valve carried by said lower sleeve of said body, a mandrel positioned to reciprocate within said body and extending through said nipple so as to be in position for contacting and operating said valve, ports connecting the upper sleeve of said body with the exterior whereby said upper sleeve may operate as a pressure chamber for vertically moving said mandrel, and a pin and slot connecting means between said body and mandrel having a portion adapted on one relative position of the mandrel and body to prohibit the mandrel being lowered sufficiently to open said valves, having a further portion adapted to permit the mandrel to be lowered relative to the body sufficient to open the valves, and having a further portion for locking the mandrel and body in the valve open position.

8. An apparatus for testing a well hole when connected with a packer and a string of pipe, said apparatus comprising a body provided in its lower portion with a normally closed valve which is adapted to be pressed downwardly into an open position, a mandrel mounted within said body and adapted in one position to engage said valve to open the same, stop means operative on one relative position of the mandrel and body to prevent the mandrel being lowered sufficiently to open the valves, and means forming in the upper portion of the body a chamber communicating with the exterior fluid of the well for elevating the mandrel relative to the body.

9. An apparatus for testing oil wells when connected with a string of pipe and packer, including a body carrying at its lower portion a normally closed valve, a mandrel having an enlarged piston forming portion at its upper end reciprocally mounted within said body, said mandrel having a hollow reduced portion and adapted to contact said valve for opening the same, means forming a pressure chamber under the piston portion of said mandrel to permit the fluid from the well to elevate the mandrel relative to the piston, an interlocking means between said body and mandrel operative in one position to prohibit the lowering of the mandrel relative to the body so as to open the valve and operative from another position to permit the mandrel to be lowered sufficiently to open said valve.

ERLE P. HALLIBURTON.